US011471973B2

(12) United States Patent
Kato et al.

(10) Patent No.: US 11,471,973 B2
(45) Date of Patent: Oct. 18, 2022

(54) LASER PROCESSING HEAD AND LASER PROCESSING SYSTEM USING SAME

(71) Applicant: Panasonic Intellectual Property Management Co., Ltd., Osaka (JP)

(72) Inventors: Naoya Kato, Osaka (JP); Takayuki Yamashita, Osaka (JP); Doukei Nagayasu, Hyogo (JP); Kenji Hoshino, Hyogo (JP); Hideaki Yamaguchi, Osaka (JP); Ryo Ishikawa, Osaka (JP); Shinya Domoto, Osaka (JP); Kiyotaka Eizumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 16/821,302

(22) Filed: Mar. 17, 2020

(65) Prior Publication Data

US 2020/0282495 A1 Sep. 10, 2020

Related U.S. Application Data

(63) Continuation of application No. PCT/JP2018/034717, filed on Sep. 20, 2018.

(30) Foreign Application Priority Data

Sep. 21, 2017 (JP) .............................. JP2017-181747

(51) Int. Cl.
*B23K 26/06* (2014.01)
*B23K 26/066* (2014.01)
(Continued)

(52) U.S. Cl.
CPC ........ *B23K 26/0626* (2013.01); *B23K 26/066* (2015.10); *B23K 26/0648* (2013.01);
(Continued)

(58) Field of Classification Search
CPC ............ B23K 26/0626; B23K 26/0648; B23K 26/066; B23K 26/10; B23K 26/128; B23K 26/707
See application file for complete search history.

(56) References Cited

U.S. PATENT DOCUMENTS 6,270,222 B1 * 8/2001 Herpst ............... G02B 27/0006
359/511
6,353,203 B1 * 3/2002 Hokodate .......... B23K 26/0648
219/121.67
(Continued)

FOREIGN PATENT DOCUMENTS

JP 1-122689 5/1989
JP 02006093 A * 1/1990 ........... B23K 26/707
(Continued)

OTHER PUBLICATIONS

Machine translation of JP02006093-A, Jan. 2022.*
(Continued)

*Primary Examiner* — Geoffrey S Evans
(74) *Attorney, Agent, or Firm* — Wenderoth, Lind & Ponack, L.L.P.

(57) ABSTRACT

Laser processing head (20) of the present disclosure includes housing (30), transparent protector (40), and temperature sensor (70). Housing (30) includes an optical path of processing laser light (LB). Transparent protector (40) is detachably fixed to housing (30), passes processing laser light (LB), and suppresses dust of work material (W) entering into housing (30). Here, the dust is generated from the work material (W) irradiated with processing laser light (LB). Temperature sensor (70) detects the temperature of transparent protector (40).

10 Claims, 3 Drawing Sheets

(51) Int. Cl.
B23K 26/70 (2014.01)
B23K 26/10 (2006.01)
B23K 26/12 (2014.01)

(52) U.S. Cl.
CPC ............ B23K 26/10 (2013.01); B23K 26/128 (2013.01); B23K 26/706 (2015.10)

(56) References Cited

U.S. PATENT DOCUMENTS

| | | | |
|---|---|---|---|
| 7,116,501 B2* | 10/2006 | Sakamoto | G02B 7/008 359/820 |
| 2016/0368089 A1* | 12/2016 | Grapov | G02B 27/40 |
| 2018/0151048 A1* | 5/2018 | Winkler | B23K 26/38 |
| 2020/0388546 A1* | 12/2020 | Horikiri | H01L 21/02389 |

FOREIGN PATENT DOCUMENTS

| | | | | |
|---|---|---|---|---|
| JP | 2002-515341 | | 5/2002 | |
| JP | 2002-361452 | | 12/2002 | |
| JP | 2012-157893 | | 8/2012 | |
| JP | 2012-187591 | | 10/2012 | |
| JP | 2013-52440 | | 3/2013 | |
| JP | 2013130856 A | * | 7/2013 | |
| WO | 99/59762 | | 11/1999 | |
| WO | WO-9959762 A1 | * | 11/1999 | ........... B23K 26/422 |

OTHER PUBLICATIONS

Machine translation of JP2013130856-A, Jan. 2022.*
International Search Report dated Dec. 18, 2018 in corresponding International (PCT) Patent Application No. PCT/JP2018/034717, with English translation.

* cited by examiner

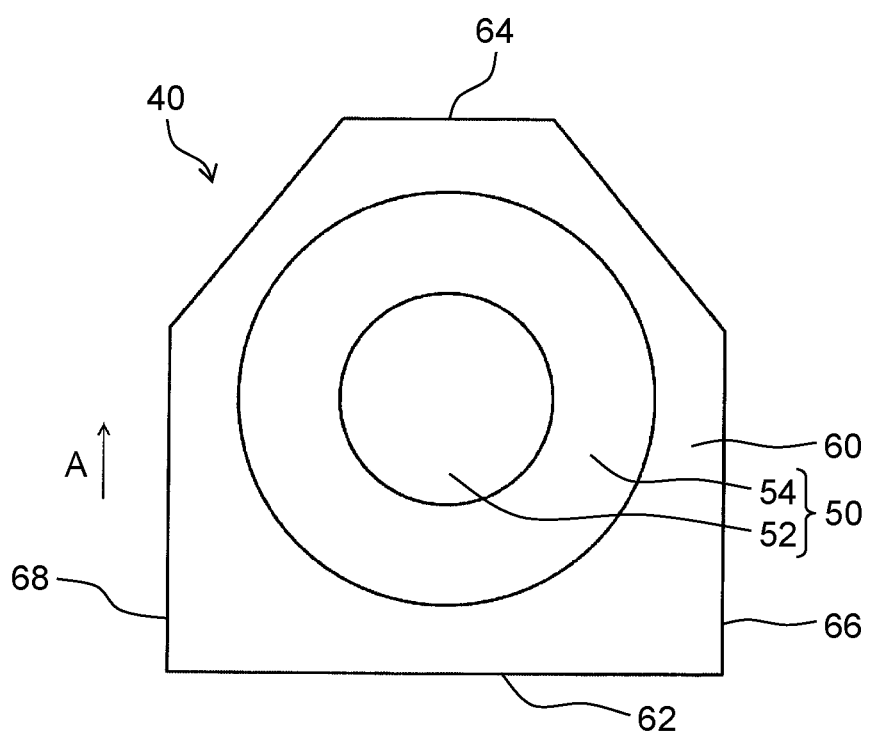

LASER PROCESSING HEAD AND LASER PROCESSING SYSTEM USING SAME

This application is a continuation application of the PCT International Application No. PCT/JP2018/034717 filed on Sep. 20, 2018, which claims the benefit of foreign priority of Japanese patent application No. 2017-181747 filed on Sep. 21, 2017, the contents all of which are incorporated herein by reference.

TECHNICAL FIELD

The present disclosure relates to a laser processing head and a laser processing system using this, and more particularly to a laser processing head configured to detect the dirt of protective glass—which is produced by the dust (sputters or fumes) generated when laser light of a high power is radiated to a work material (work)—, and to a laser processing system using this.

BACKGROUND ART

A laser processing head used for a laser processing system includes a collecting lens that collects laser light of a high power oscillated from a laser oscillation device. The collecting lens further increases the energy density of the laser light, and radiates the laser light to a work material to process the work material (welding, fusing, or punching). At this time, the sputters or fumes (for example, evaporated zinc metal particles) generated from the work material can scatter into a surrounding embodiment, and can contaminate the surface of the collecting lens. When the sputters or fumes adhere to the collecting lens to contaminate the lens, the optical characteristic (light transmittance or the like) of the collecting lens reduces, and the intensity of the laser light to be radiated to the work material decreases. Therefore, the laser processing head includes a protective glass for protecting the collecting lens from contaminants such as the sputters or fumes.

For example, Patent Literature 1 describes a laser processing head that includes a protective glass for protecting the collecting lens from contaminants (dust) such as sputters or fumes. The laser processing head further includes a dirt detecting means for detecting the dirt adhering to the protective glass. Furthermore, in the description, the laser processing head of Patent Literature 1 suppresses the adhesion of the contaminants to the protective glass of an air downstream side (rim), by blowing off the contaminants with the air ejected from an air ejecting means.

Patent Literature 1 describes a dirt detecting means (optical fiber connected to an optical sensor) disposed at the rim of the protective glass. The protective glass with contaminants diffusely reflects the detection light which has been radiated diagonally upward from a plurality of point light sources toward the protective glass. The dirt detecting means detects the diffusely reflected detection light. Patent Literature 1 describes that, when the detection value of the diffusely reflected detection light becomes higher than a previously set reference value, the protective glass is replaced.

CITATION LIST

Patent Literature

PTL 1: Unexamined Japanese Patent Publication No. 2013-052440

SUMMARY OF THE INVENTION

Technical Problem(s)

However, a dirt detecting means described in Patent Literature 1 is disposed on the rim (substantially the same height level as the protective glass) of the protective glass. Therefore, the intensity of the diffusely reflected light coming from contaminants adhering to the protective glass is low and its detection value also low, and hence the contaminants adhering to the protective glass cannot be accurately detected. Due to the described arrangement of the dirt detecting means, the following phenomena occur: the dirt detecting means easily and directly detects illumination light from a plurality of point light sources or reflected light; and the dirt detecting means is apt to be adversely affected by the light (disturbance light) scattered by the contaminants such as sputters or fumes floating under the protective glass.

The present disclosure is provided for solving the above-mentioned problems. The present disclosure provides a laser processing head for detecting the degree of the adhesion of the contaminants in a method different from the conventional method, and provides a laser processing system using this head.

Solution(s) to Problem(s)

A first aspect in accordance with the present disclosure relates to a laser processing head. The laser processing head includes a housing, a transparent protector that is detachably fixed to the housing, and a temperature sensor that detects the temperature of the transparent protector. The housing includes an optical path of processing laser light. The transparent protector passes the processing laser light, and suppresses dust, which is generated from the work material irradiated with the processing laser light, entering into the housing.

A second aspect in accordance with the present disclosure relates to a laser processing system. The laser processing system includes a processing laser light source, a housing, a transparent protector that is detachably fixed to the housing, a temperature sensor that detects the temperature of the transparent protector, and a controller connected to the processing laser light source and the temperature sensor. The housing includes an optical path of processing laser light coming from the processing laser light source. The transparent protector passes the processing laser light, and suppresses dust, which is generated from the work material irradiated with the processing laser light, entering into the housing.

Advantageous Effect(s) of Invention

The transparent protector having the contaminants (dust) is heated by the irradiated processing laser light. In the laser processing head and laser processing system related to one aspect of the present disclosure, the degree of the contaminants adhering to the transparent protector can be detected by using the temperature of the transparent protector. In other words, by using the laser processing head and laser processing system related to one aspect of the present disclosure, the degree of the contaminants adhering to the transparent protector can be detected in a method different from the conventional method.

BRIEF DESCRIPTION OF DRAWINGS

FIG. 3 is a plan view showing a transparent protector in accordance with the first exemplary embodiment.

DESCRIPTION OF EMBODIMENTS

Figure 1:
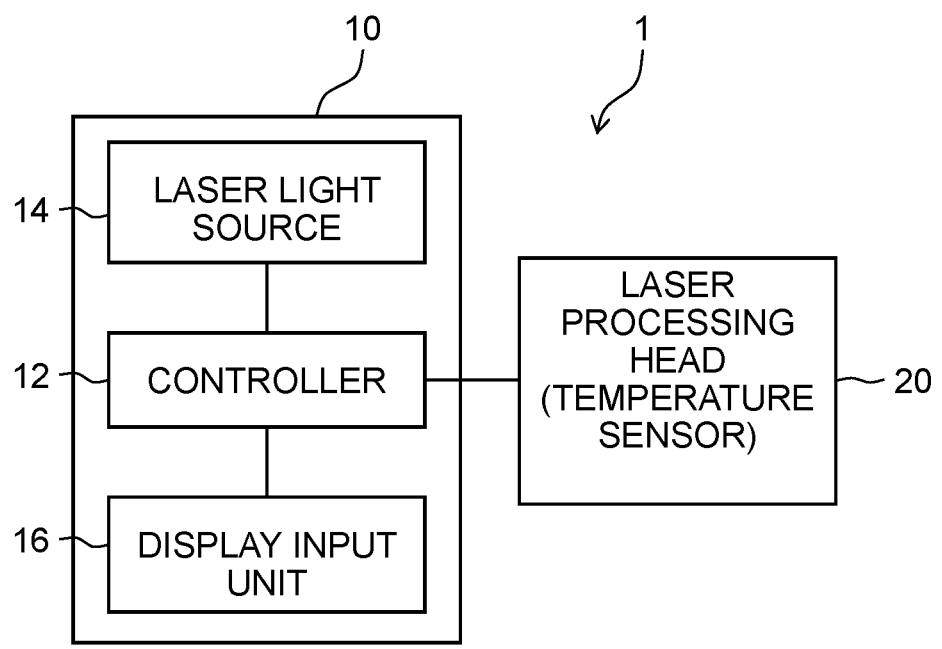
FIG. 1 is a block diagram showing a schematic configuration of a laser processing system in accordance with a first exemplary embodiment.

First, a schematic configuration of laser processing system 1 related to one aspect of the present disclosure is described. Laser processing system 1 related to one aspect of the present disclosure includes processing laser light source (simply referred to also as "laser light source") 14; housing 30; transparent protector 40 that is detachably fixed to housing 30; temperature sensor 70 that detects the temperature of transparent protector 40; and controller 12 connected to processing laser light source 14 and temperature sensor 70. Housing 30 includes an optical path of processing laser light (simply referred to also as "laser light") LB from the processing laser light source 14. Transparent protector 40 passes processing laser light LB, and suppresses dust, which is generated from work material W irradiated with processing laser light LB, entering into housing 30. For example, when the temperature of transparent protector 40 detected by temperature sensor 70 exceeds an allowable temperature, controller 12 can determine that the temperature of transparent protector 40 exceeds the allowable temperature (or the allowable dirt degree of glass plate 50). Therefore, controller 12 can urge a user to perform the replacement of transparent protector 40.

Processing laser light LB is near-infrared light. Transparent protector 40 has glass plate 50 having a portion for passing processing laser light LB. Temperature sensor 70 may include an infrared radiation thermometer. The thermometer optically detects the temperature of glass plate 50 by detecting the peak wavelength of far-infrared light generated by black-body radiation from the dust adhering to glass plate 50. Even when processing laser light LB is reflected on work material W adhering to glass plate 50, temperature sensor 70 can clearly distinguish between the reflected light (near-infrared light) and the far-infrared light (black-body radiation light) to be detected. Therefore, controller 12 can further certainly detect the degree of the contaminants adhering to transparent protector 40 at a higher reliability. In other words, controller 12 can accurately detect that the temperature of transparent protector 40 exceeds an allowable temperature, (or an allowable dirt degree of glass plate 50), furthermore the time for replacement of transparent protector 40.

Furthermore, glass plate 50 may include: exposure region 52 for passing processing laser light LB; and non-exposure region 54 that does not pass processing laser light LB. Temperature sensor 70 may optically detect the temperature of glass plate 50 in non-exposure region 54. Even when processing laser light LB is radiated to the dust adhering to glass plate 50, and a part of glass plate 50 is heated locally the temperature of glass plate 50 in non-exposure region 54 that is apt to have a further uniform temperature can be optically detected. Thus, the detection error of the temperature due to variation (non-uniformity) of the dust adhering to glass plate 50 can be suppressed as much as possible.

Housing 30 may include shade 72 that blocks the light coming into temperature sensor 70 from glass plate 50 in exposure region 52. Thus, the components of temperature sensor 70 can be protected from the reflected light of processing laser light LB of a high power, and the long-term reliability of temperature sensor 70 can be secured.

Transparent protector 40 includes: glass plate 50 including a portion for passing processing laser light LB; and frame 60 for holding glass plate 50. The temperature sensor may detect the temperature of glass plate 50 by electrically detecting the temperature of frame 60. Similarly to temperature sensor 70 for optically detecting the temperature of transparent protector 40, —on the basis of the temperature of transparent protector 40 that is indirectly detected by electrically detecting the temperature of frame 60—, controller 12 can determine the dirt degree and/or the time for replacement of transparent protector 40.

Furthermore, laser processing system 1 further includes a display connected to controller 12. Controller 12 may cause the display to display the temperature of transparent protector 40 detected by temperature sensor 70. Alternatively, controller 12 may cause the display to display the output reduction rate representing the output reduction of processing laser light LB radiated to work material W. Here, the output reduction is caused by the dust adhering to transparent protector 40. Thus, the user can know the relative value (output reduction rate indicating the degree of decrease in output) between the following values: the intensity of processing laser light LB absorbed by the dust adhering to glass plate 50; and the output intensity of processing laser light LB.

Furthermore, laser processing system 1 further includes an input unit connected to controller 12. Controller 12 may receive, via the input unit, a set value of the output reduction rate representing the output reduction of processing laser light LB radiated to work material W. Here, the output reduction is caused by the dust adhering to transparent protector 40. Thus, the user can be informed of the time for replacement of transparent protector 40 according to the cost-effectiveness demanded by the user. Here, the time for replacement is obtained, by comparing the detected output reduction rate of processing laser light LB radiated to work material W with the set value of a previously set output reduction rate.

First Exemplary Embodiment

Hereinafter, the exemplary embodiments of a laser processing head related to the present disclosure and a laser processing system using this are described with reference to the accompanying drawings. In the description of the exemplary embodiments, the terms (for example, "longitudinal" and "lateral") showing the directions are appropriately used for facilitating the understanding. These terms are used for description, and do not limit the present disclosure. In each drawing, these sizes are relatively shown in order to clarify the shapes or features of the components of the laser processing head, and they are not necessarily shown in the same scale ratio.

Laser processing system 1 related to the first exemplary embodiment is described with reference to FIG. 1 to FIG. 3. FIG. 1 is a block diagram showing a schematic configuration of laser processing system 1 in accordance with the first exemplary embodiment. Laser processing system 1 schematically includes: laser oscillation device 10; and laser processing head 20 connected to laser oscillation device 10 via a process fiber (not shown). Laser oscillation device 10 includes: controller 12; laser light source 14 electrically connected to controller 12; and display input unit 16 (user interface device). Laser processing head 20 includes temperature sensor 70 described later in detail, and electrically connected to controller 12 of laser oscillation device 10.

Laser light source 14 radiates laser light (processing laser light) LB to work material (work) W, and welds, fuses, and punches work material W. Hereinafter, as one example, laser light source 14 is a direct diode laser (DDL) light source for outputting laser light LB of a high power (1 kW or more). The laser light LB from laser light source 14 is near-infrared light as one example, and its peak wavelength is 975 nm (0.975 μm).

Infrared light is categorized into three regions according to the wavelength, and is typically categorized into near-infrared light (0.78 μm to 2 μm), mid-infrared light (2 μm to 4 μm), and far-infrared light (4 μm to 1000 μm). The wavelength regions of these laser lights may be used as the wavelengths of laser light LB. Temperature sensor 70 described later may be an infrared radiation thermometer for optically detecting the temperature by detecting infrared light within a detection wavelength region. The wavelength region of laser light LB coming from laser light source 14 is preferably different from the detection wavelength region of temperature sensor 70.

Display input unit 16 includes: an inputting means (input unit) allowing the user to adjust the intensity of laser light LB coming from laser light source 14; and a displaying means (display) for showing the temperature data from temperature sensor 70 to the user. For example, display input unit 16 is a general-purpose touch panel. Display input unit 16 related to one aspect of the present disclosure is not limited to the general-purpose touch panel. Display input unit 16 may be any user interface device. In the user interface device, the user inputs an intensity into the user interface device in order to adjust the intensity of laser light LB, and the user is informed of the temperature data from temperature sensor 70. The display input unit may separately include the display and the input unit (for example, keyboard).

Figure 2:
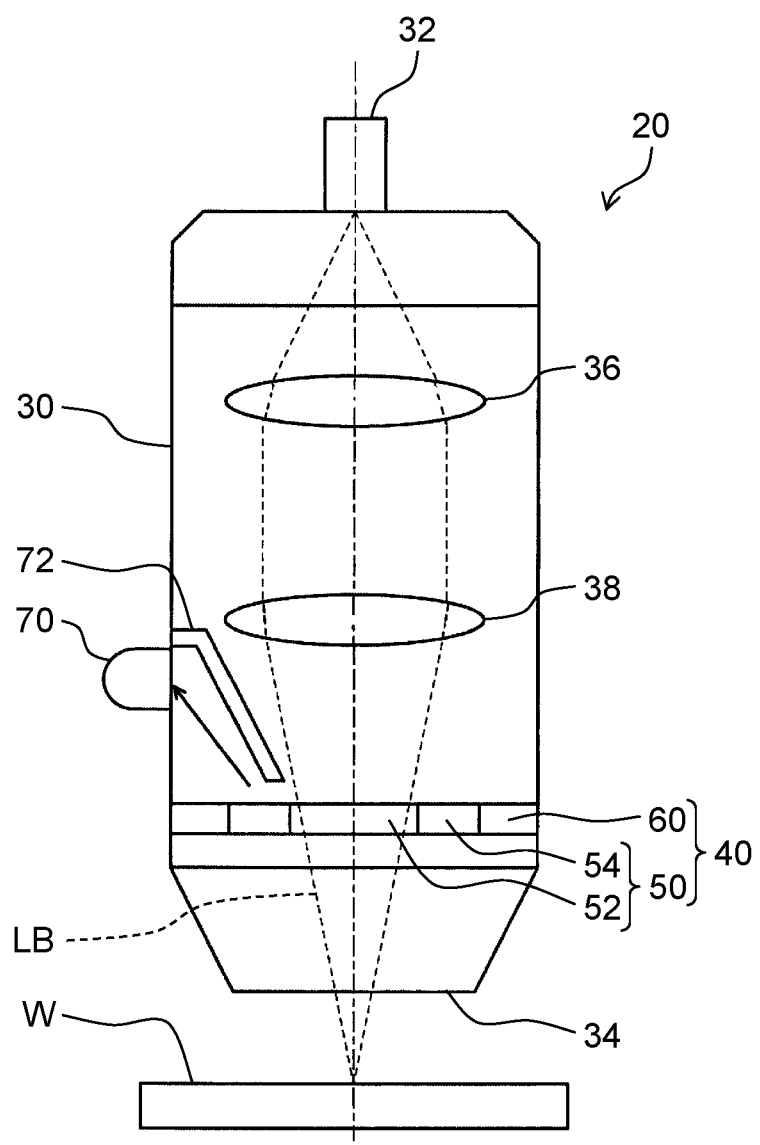
FIG. 2 is a schematic diagram showing a configuration of a laser processing head in accordance with the first exemplary embodiment.

FIG. 2 is a schematic diagram showing a configuration of laser processing head 20 in accordance with the first exemplary embodiment. Laser processing head 20 is connected to an incident connector (not shown) of the process fiber (not shown) for transmitting laser light LB coming from laser light source 14. Laser processing head 20 includes housing 30 having; incident end 32 for receiving laser light LB; and outgoing end 34 for outputting (radiating) laser light LB. In other words, housing 30 includes the optical path of laser light LB from laser light source 14 between incident end 32 and outgoing end 34.

In housing 30, laser processing head 20 includes collimator lens 36, collecting lens 38, and transparent protector 40. Collimator lens 36 converts laser light LB coming from incident end 32 into parallel light. Collecting lens 38 collects the parallel light Transparent protector 40 suppresses dust, which is generated from work material W irradiated with the laser light LB, entering into housing 30. In other words, transparent protector 40 protects the components (especially, collecting lens 38) in housing 30 from the dust of work material W.

Furthermore, housing 30 of laser processing head 20, which is not shown in detail, has a (detachably fixable) slit into which transparent protector 40 can be detachably fitted. As discussed above, transparent protector 40 protects the components in housing 30 from the dust of work material W. Therefore, it is preferable that transparent protector 40 has a shape and size so as to prevent a gap from being formed between transparent protector 40 and housing 30 when transparent protector 40 is fitted into the slit.

FIG. 3 is a plan view showing transparent protector 40 in accordance with the first exemplary embodiment. Transparent protector 40 includes: glass plate 50 made of quartz glass or the like; and frame 60 for fixing the periphery of glass plate 50. Frame 60 may be made of any material having a heat resistance, but it is preferable that this material is a metal (steel such as SUS) having a high strength and an electric conductivity. Transparent protector 40 is inserted into the slit of housing 30 in the direction shown by arrow A. For convenience of description, in FIG. 3, frame 60 includes front end 62, rear end 64, right side portion 66, and left side portion 68. Glass plate 50 includes: exposure region 52 for passing processing laser light LB; and non-exposure region 54 that does not pass processing laser light LB.

Laser light source 14 provides laser light LB of a high power such as, for example, 1 kW or more to process work material W. Work material W irradiated with laser light LB of a high power generates evaporated composition or dust (for example, zinc vapor) of work material W. The evaporated composition or dust adheres to transparent protector 40 attached to housing 30 of laser processing head 20. The dust adhering to transparent protector 40 is opaque. The dust adhering to exposure region 52 absorbs laser light LB coming from laser light source 14. As a result, transparent protector 40 in exposure region 52 is heated, and the intensity of laser light LB radiated to work material W is reduced.

For example, when laser light LB of an intensity corresponding to 1000 W is output from laser light source 14, and when the dust of work material W absorbs laser light LB of the intensity corresponding to 100 W, laser light LB of the intensity corresponding to 900 W is radiated to work material W (output reduction rate becomes 10%). Therefore, a desired processing rate or processing accuracy cannot be obtained. Furthermore, transparent protector 40 is extremely degraded, and the components in housing 30 are exposed to a high temperature of an allowable temperature or more.

Incidentally, when the mass of glass plate 50 is about 5 g and its specific heat is about 0.67 J/gK, the heat capacity required for increasing the temperature of glass plate 50 by 1 K is about 3.35 J. Glass plate 50 is heated to about 50° C. (room temperature is 20° C.), when the following assumptions are established: laser light LB corresponding to 100 W (10% of the initial laser output intensity) is absorbed by the dust of work material W; and only glass plate 50 of transparent protector 40 is heated.

Laser processing head 20 in accordance with the first exemplary embodiment includes temperature sensor 70 attached to housing 30 as shown in FIG. 2. Laser light LB from laser light source 14 is partially absorbed by the dust adhering to transparent protector 40. The absorbed laser light LB is not radiated to work material W. Temperature sensor 70 detects the intensity (or output reduction rate of laser light LB) of the absorbed laser light LB.

Next, temperature sensor 70 in accordance with the first exemplary embodiment is described in detail. Temperature sensor 70 is an infrared radiation thermometer. The thermometer optically detects the temperature of glass plate 50 by detecting the far-infrared light (peak wavelength) generated by black-body radiation from the dust adhering to glass plate 50 of transparent protector 40. Temperature sensor 70 (infrared radiation thermometer), which is not shown in detail, may include the following components, for example:

any photodetector (photodetector, photodiode, or photomultiplier) for converting light into electricity; and a band-pass filter for passing the light of a specific wavelength band. Furthermore, temperature sensor 70 may be a thermography that optically measures the temperature of glass plate 50 and displays the measured temperature as a color image.

Hereinafter, temperature sensor 70 is described as one example.

Temperature sensor 70 includes a photodetector (PD). Temperature sensor 70 receives the far-infrared light generated by black-body radiation from the dust via a bandpass-filter for passing light of a wavelength band of 8.83 μm to 9.11 μm, for example. In other words, temperature sensor 70 outputs an electric signal corresponding to the intensity of the light of a wavelength band of 8.83 μm to 9.11 μm having passed through the bandpass filter.

When the dust of work material W is not adhering to glass plate 50 of transparent protector 40, most of laser light LB transmits (passes) through glass plate 50, and is radiated to work material W. Therefore, the temperature of glass plate 50 is equivalent to room temperature (for example, 20° C.). However, when laser light LB is continued to be radiated to work material W, the dust of work material W is accumulated on the glass plate 50 of transparent protector 40. The dust is accumulated in a larger area of glass plate 50 (the dirt gets worse), the loss of laser light LB passing through glass plate 50 increases and the temperature of glass plate 50 increases.

While, according to Wien's displacement law, peak wavelength (λ) of far-infrared light generated by black-body radiation is expressed by the following equation using absolute temperature (T). Here, the Wien's displacement law shows that the peak wavelength of the black-body radiation (radiation from the black-body) is inversely proportional to the temperature.

$$\lambda = 2897/T \tag{1}$$

Here, the unit of peak wavelength (λ) is micron (μm), and the unit of absolute temperature T is Kelvin (K).

Temperature sensor 70 has the characteristic in which the electric signal output from temperature sensor 70 extremely increases in the following cases: the far-infrared light generated by black-body radiation from the dust of work material W has a peak wavelength at which the intensity of the light becomes maximum in the wavelength band of about 8.83 μm to about 9.11 μm; namely the temperature of glass plate 50 is about 45° C. to about 55° C. (room temperature is 20° C. (293K)). In other words, when new transparent protector 40 is mounted to laser processing head 20 and then laser light LB is radiated to work material W; adhesion degree (contamination degree) of the dust to glass plate 50 increases, and the electric signal output from temperature sensor 70 to controller 12 increases. Therefore, when the peak wavelength becomes lower than a predetermined value and temperature sensor 70 detects the peak wavelength of the wavelength band of about 8.83 μm to about 9.11 μm; controller 12 can determine that the temperature of glass plate 50 arrives at about 45° C. to about 55° C. Then, controller 12 cause display input unit 16 to display the temperature (about 45° C. to about 55° C.) of glass plate 50.

The wavelength band for passing the light of a bandpass filter—which is not limited to the above-mentioned one —, may be a wavelength band corresponding to the temperature of about 50° C.±0.5° C. of glass plate 50, for example. At this time, controller 12 can more finely (more accurately) detect the temperature range of the temperature increase of glass plate 50. Temperature sensor 70 includes a bandpass filter of a wavelength band corresponding to each of a plurality of temperatures to be detected. Controller 12 may more elaborately monitor the temporal change of the temperature of glass plate 50 after the radiation of laser light LB. Thus, controller 12 may show, to the user, the temperature of glass plate 50 as needed via display input unit 16. Controller 12 may also show, to the user, the dirt degree of glass plate 50, and the time for replacement of transparent protector 40 or the sign of the time for replacement.

Furthermore, when temperature sensor 70 has detected a peak wavelength lower than the peak wavelength of the wavelength band of about 8.83 μm to about 9.11 μm for example, as a predetermined value: controller 12 can determine that glass plate 50 of transparent protector 40 absorbs laser light LB of an intensity exceeding 10% of initial laser light LB, for example, (output reduction rate exceeds 10%). Then, controller 12 causes display input unit 16 to display this output reduction rate (for example, 10%, or exceeding 10%). At this time, controller 12 may inform, via display input unit 16, the user of the requirement of replacement of transparent protector 40 or the approach to the time for replacement.

Furthermore, the following method is allowed. The user inputs, as a set value, the relative value (output reduction rate, for example 10%) between the following values: the intensity of laser light LB absorbed by the dust adhering to glass plate 50; and the output intensity of laser light LB. When the relative value arrives at the input output reduction rate, controller 12 may inform the user of the arrival via display input unit 16. Thus, by comparing the detected output reduction rate of processing laser light LB radiated to work material W with the set value of a previously set output reduction rate; the user is informed of the time for replacement of transparent protector 40 according to the cost-effectiveness demanded by the user. Here, when the user can input any output reduction rate, a bandpass filter of a wavelength band corresponding to each output reduction rate must be disposed in temperature sensor 70.

In the above-mentioned example, display input unit 16 visually shows the time for replacement to the user, but is not limited to this. The time for replacement may be shown to the user using an acoustic means such as a buzzer.

As discussed above, laser light LB from laser light source 14 is near-infrared light having a peak wavelength of 975 nm (0.975 μm), for one example. While, the black-body radiation light coming from the dust adhering to glass plate 50 is far-infrared light having a wavelength band of about 8.83 μm to about 9.11 μm, for example. In Patent Literature 1, the wavelengths of the detected reflected light and the disturbance light (both are near-infrared light) are the same, so that detection error is apt to be caused. However, in the present disclosure, even when laser light LB is reflected on work material W adhering to glass plate 50, the reflected light (near-infrared light) can be clearly distinguished from far-infrared light (black-body radiation light) to be detected. Therefore, the temperature of transparent protector 40, namely, the dirt degree of glass plate 50 (further, the time for replacement of transparent protector 40) can be accurately detected.

Furthermore, the dust of work material W does not always uniformly adhere to glass plate 50, but adheres to a part of glass plate 50. Therefore, a part of exposure region 52 of glass plate 50 is sometimes heated by laser light LB of a high power, and glass plate 50 locally has high temperature. Furthermore, glass plate 50 has a low thermal conductivity and exposure region 52 is connected to non-exposure region 54 in glass plate 50. Therefore, the heat generated in exposure region 52 is conducted to non-exposure region 54, and glass plate 50 in non-exposure region 54 is apt to have more uniform temperature. Therefore, preferably, temperature sensor 70 is configured to optically detect the temperature of glass plate 50 in non-exposure region 54. Specifically, temperature sensor 70 may be disposed so that the optical axis of the far-infrared light coming into temperature sensor 70 points to non-exposure region 54. Thus, the detection error of the temperature due to variation (non-uniformity) of the dust adhering to glass plate 50 can be suppressed as much as possible.

Incidentally, as discussed above, temperature sensor 70 (infrared radiation thermometer) related to the present disclosure does not detect the reflected light by the dust adhering to glass plate 50. However, the intensity (optical energy) of the reflected light of laser light LB of a high power is extremely higher than that of the far-infrared light (black-body radiation light). Therefore, when the bandpass filter constituting temperature sensor 70 is exposed to the reflected light having a high optical energy for a long time, the bandpass filter is heated to be deteriorated and can damage the desired optical characteristic. Then, as shown in FIG. 2, laser processing head 20 of the present disclosure may include shade 72, which extends from the inner wall of housing 30, between temperature sensor 70 and exposure region 52 of glass plate 50. Here, shade 72 is used for blocking the direct reflected light of laser light LB coming into temperature sensor 70 from glass plate 50 in exposure region 52. Thus, the components of temperature sensor 70 are protected from the reflected light of laser light LB of a high power, and the long-term reliability of temperature sensor 70 can be secured.

Modified Example of First Exemplary Embodiment

Temperature sensor 70 in accordance with the first exemplary embodiment has been described as an infrared radiation thermometer. The thermometer optically detects the temperature of glass plate 50 by detecting the far-infrared light (peak wavelength) generated by black-body radiation from the dust adhering to glass plate 50 of transparent protector 40. However, the temperature sensor of the present disclosure may electrically detect the temperature of glass plate 50.

Generally, when laser light LB is radiated to the dust adhering to glass plate 50, glass plate 50 is heated, further the heat is conducted to frame 60 for fixing the periphery of glass plate 50, and frame 60 is indirectly heated. Therefore, by detecting the temperature of frame 60, the temperature of glass plate 50 can be indirectly detected.

The temperature sensor related to the modified example may be a thermistor or thermocouple disposed at front end 62 or rear end 64 of frame 60, for example. Alternatively, the temperature sensor related to the modified example may detect the temperature of frame 60, by detecting the electric resistance between the terminals connected to right side portion 66 and left side portion 68 of frame 60 having an electric conductivity. Thus, similarly to the first exemplary embodiment, controller 12 can determine the dirt degree of glass plate 50 and the time for replacement of transparent protector 40—on the basis of the indirectly detected temperature of glass plate 50.

Other Example

In the description of the first exemplary embodiment and the modified example, laser light source 14 is a direct diode laser (DDL) light source, laser light LB from laser light source 14 is near-infrared light, and its peak wavelength is 975 nm. However, laser light source 14 is not limited to this. In other words, laser light source 14 may radiate the light of another wavelength of the DDL light source, or may be a light source other than the DDL light source. Laser light LB from laser light source 14 may be the light of a wavelength capable of being clearly distinguished from the far-infrared light generated by black-body radiation from the dust adhering to glass plate 50 of transparent protector 40. In other words, it is preferable—in order to prevent a detection error—that the wavelength region of the laser light LB from laser light source 14 is different from the detection wavelength of the infrared light used for optically detecting the temperature with temperature sensor 70.

INDUSTRIAL APPLICABILITY

The present disclosure can be applied to a laser processing head for detecting the degree of the contaminants adhering to a transparent protector (glass plate) at a higher reliability.

REFERENCE MARKS IN THE DRAWINGS 1 laser processing system
10 laser oscillation device
12 controller
14 laser light source (processing laser light source)
16 display input unit (user interface device)
20 laser processing head
30 housing
32 incident end
34 outgoing end
36 collimator lens
38 collecting lens
40 transparent protector
50 glass plate
52 exposure region
54 non-exposure region
60 frame
62 front end
64 rear end
66 right side portion
68 left side portion
70 temperature sensor
72 shade
W work material (work)
LB laser light (processing laser light)

The invention claimed is:
1. A laser processing system comprising:
a processing laser light source;
a housing including an optical path of a processing laser light coming from the processing laser light source;
a transparent protector configured to be detachably fixed to the housing, to pass the processing laser light, and to suppress dust entering into the housing, the dust being generated from the work material irradiated with the processing laser light;
a temperature sensor configured to detect a temperature of the transparent protector;
a controller coupled to the processing laser light source and the temperature sensor; and
a display coupled to the controller, wherein
the controller causes the display to perform one of:
displaying the temperature of the transparent protector detected by the temperature sensor; and
displaying an output reduction rate representing an output reduction of the processing laser light radiated to the work material, the output reduction being caused by the dust adhering to the transparent protector.

2. The laser processing system according to claim 1, wherein
the processing laser light includes a near-infrared light,
the transparent protector has a glass plate having a portion configured to pass the processing laser light, and
the temperature sensor includes an infrared radiation thermometer, the infrared radiation thermometer being configured to optically detect a temperature of the glass plate by detecting a peak wavelength of a far-infrared light generated by a black-body radiation from the dust adhering to the glass plate.

3. The laser processing system according to claim 2, wherein
the glass plate includes:
an exposure region configured to pass the processing laser light; and
a non-exposure region configured not to pass the processing laser light, and
the temperature sensor optically detects the temperature of the glass plate in the non-exposure region.

4. The laser processing system according to claim 3, wherein
the housing includes a shade configured to block a light coming into the temperature sensor from the glass plate in the exposure region.

5. The laser processing system according to claim 1, wherein
the transparent protector includes:
a glass plate including a portion configured to pass the processing laser light; and
a frame configured to hold the glass plate, and
the temperature sensor detects a temperature of the glass plate by electrically detecting a temperature of the frame.

6. A laser processing system comprising:
a processing laser light source;
a housing including an optical path of a processing laser light coming from the processing laser light source;
a transparent protector configured to be detachably fixed to the housing, to pass the processing laser light, and to suppress dust entering into the housing, the dust being generated from the work material irradiated with the processing laser light;
a temperature sensor configured to detect a temperature of the transparent protector;
a controller coupled to the processing laser light source and the temperature sensor; and
an input unit coupled to the controller, wherein
the controller is configured to receive, via the input unit, a set value of an output reduction rate representing an output reduction of the processing laser light radiated to the work material, the output reduction being caused by the dust adhering to the transparent protector.

7. A laser processing system according to claim 6, wherein
the processing laser light includes a near-infrared light,
the transparent protector has a glass plate having a portion configured to pass the processing laser light, and
the temperature sensor includes an infrared radiation thermometer, the infrared radiation thermometer being configured to optically detect a temperature of the glass plate by detecting a peak wavelength of a far-infrared light generated by a black-body radiation from the dust adhering to the glass plate.

8. The laser processing system according to claim 7, wherein
the glass plate includes:
an exposure region configured to pass the processing laser light; and
a non-exposure region configured not to pass the processing laser light, and
the temperature sensor optically detects the temperature of the glass plate in the non-exposure region.

9. The laser processing system according to claim 8, wherein
the housing includes a shade configured to block a light coming into the temperature sensor from the glass plate in the exposure region.

10. The laser processing system according to claim 6, wherein
the transparent protector includes:
a glass plate including a portion configured to pass the processing laser light; and
a frame configured to hold the glass plate, and
the temperature sensor detects a temperature of the glass plate by electrically detecting a temperature of the frame.

* * * * *